(12) United States Patent
Kong et al.

(10) Patent No.: US 6,299,107 B1
(45) Date of Patent: Oct. 9, 2001

(54) SPACECRAFT CAPTURE AND DOCKING SYSTEM

(75) Inventors: Kinyuen Kong, Baldwin; Shaheed Rafeek, Fresh Meadows, both of NY (US); Thomas Myrick, Warren, NJ (US)

(73) Assignee: Honeybee Robotics, Ltd., New York, NY (US)

( * ) Notice: Subject to any disclaimer, the term of this patent is extended or adjusted under 35 U.S.C. 154(b) by 0 days.

(21) Appl. No.: 09/205,503

(22) Filed: Dec. 4, 1998

(51) Int. Cl.[7] .................................................. B64G 1/62
(52) U.S. Cl. .................................................. 244/161
(58) Field of Search ........................... 244/115, 116, 244/161, 114, 110; 102/378

(56) References Cited

U.S. PATENT DOCUMENTS 4,177,964 * 12/1979 Hujsak et al. ...................... 244/161
4,588,150 * 5/1986 Bock et al. .......................... 244/161

* cited by examiner

*Primary Examiner*—Charles T. Jordan
*Assistant Examiner*—Francis T. Palo
(74) *Attorney, Agent, or Firm*—Leighton K. Chong

(57) ABSTRACT

A system for capturing and docking an active craft to a passive craft has a first docking assembly on the active craft with a first contact member and a spike projecting outwardly, a second docking assembly on the passive craft having a second contact member and a flexible net deployed over a target area with an open mesh for capturing the end of the spike of the active craft, and a motorized net drive for reeling in the net and active craft to mate with the passive craft's docking assembly. The spike has extendable tabs to allow it to become engaged with the net. The net's center is coupled to a net spool for reeling in. An alignment funnel has inclined walls to guide the net and captured spike towards the net spool. The passive craft's docking assembly includes circumferentially spaced preload wedges which are driven to lock the wedges against the contact member of the active craft. The active craft's docking assembly includes a rotary table and drive for rotating it to a predetermined angular alignment position, and mating connectors are then engaged with each other. The system may be used for docking spacecraft in zero or low-gravity environments, as well as for docking underwater vehicles, docking of ancillary craft to a mother craft in subsonic flight, in-flight refueling systems, etc.

18 Claims, 11 Drawing Sheets

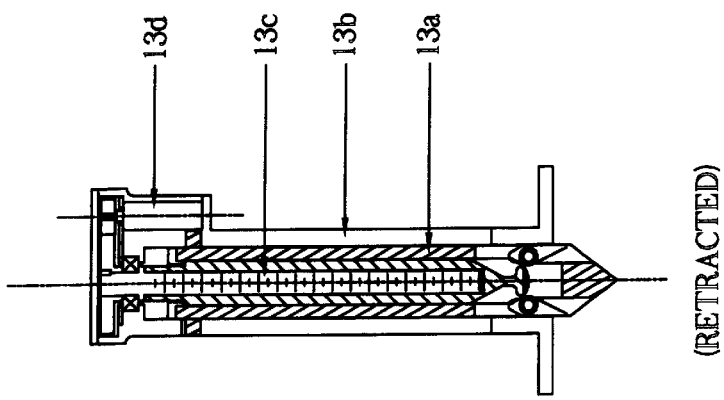
FIGURE 4B (RETRACTED)
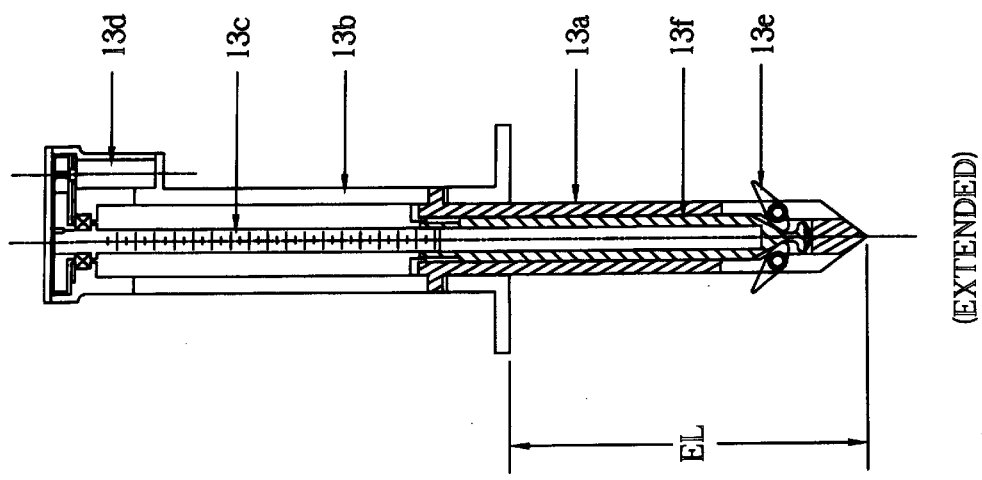
FIGURE 4A (EXTENDED)

SPACECRAFT CAPTURE AND DOCKING SYSTEM

This invention was developed pursuant to work performed under Contract No. NAS5-32813 for the National Aeronautics and Space Administration (NASA). The U.S. Government retains certain rights in the invention.

TECHNICAL FIELD

This invention generally relates to apparatus for docking an active craft in motion relative to a passive craft, and more particularly, to a spacecraft capture and docking system.

BACKGROUND OF INVENTION

Conventional spacecraft docking mechanisms have generally relied upon precise control of inertial propulsion systems such as small thruster jets to position an active craft in motion relative to a passive craft for docking. Such inertial propulsion systems have been very difficult to control and present a constant risk of misalignment and possible collision and damage to the spacecraft.

SUMMARY OF INVENTION

The purpose of this invention is to provide a robust, fail-safe and reliable automated capture and docking system for unmanned (or manned) spacecrafts. A principal object is that the capture mechanism be fail-safe and does not require complicated guidance and maneuverability controls on the part of the active spacecraft.

In accordance with the invention, a system for capturing and docking an active craft to a passive craft comprises: a first docking assembly arranged at an exposed portion of the active craft having a first contact member, and a spike member fixed in a central position with a capture end projecting outwardly from said first contact member; a second docking assembly arranged at an exposed portion of the passive craft having a second contact member for mating with said first contact member of the active craft, a flexible net having an open-mesh capture area deployed over a target area of said second contact member, and a motorized net drive for reeling in the capture area of said net into a recessed portion of the passive craft's docking assembly, said spike member having means on its capture end for engaging said flexible net; and means for actuating said motorized net drive when said spike member has become engaged with said flexible net so as to reel in said spike member and guide said first contact member of the active craft into mating contact with said second contact member of the passive craft.

In a preferred embodiment of the invention, the active craft's contact member is composed of a rotary ring or table and an actuator drive for rotating the rotary table to a predetermined alignment position relative to the passive craft's contact member. The spike member is extendable from a telescope-type housing and has extendable capture tabs on its capture end to allow it to become engaged with the net. The passive craft's docking assembly includes a plurality of preload wedges spaced circumferentially around its contact member, and a motorized drive for driving the wedges to locking positions against the circumferential edge of the active craft's rotary table after it has been mated and aligned with the passive craft's contact member.

The net's outer edges are coupled by belts entrained around rollers to spring-loaded windup reels. The center point of the capture area of the net is coupled by a belt to a net spool located in a recessed portion of the passive craft's docking assembly. An alignment funnel is provided with inclined walls tapering from an inner annulus of the passive craft's contact member inwardly to guide the net with the captured end of the spike member towards the net spool in the recessed portion of the docking assembly. Mating connectors are provided on the active craft and passive craft to be engaged with each other once the docking assemblies have been mated, aligned, and locked to each other. To release the active craft from the passive craft, a reverse sequence is performed of disengaging the connectors, releasing the preload wedges, reeling out the net, and retracting the capture tabs to release the spike member and the active craft from engagement with the net.

In the docking system of the invention, the capture, mating, pre-loading, and locking functions of the active spacecraft to the passive craft are accomplished by the combination of the spike member and net capture and by sensor-controlled drive mechanisms. The invention system avoids the need for the complicated flight controls and maneuvers associated with the use of jet thrusters. By first making soft contact with the net then reeling in and locking down the active craft, the invention system also greatly reduces the risk of collision and damage to the spacecraft.

Other objects, features, and advantages of the present invention will be explained in the following detailed description of the invention having reference to the appended drawings.

BRIEF DESCRIPTION OF DRAWINGS

FIGS. 4A and 4B are schematic views showing a spike member of the active craft's docking assembly in the extended and retracted positions.

DETAILED DESCRIPTION OF INVENTION

The automated capture and docking system of the present invention utilizes a soft contact between an extended spike member and a flexible net to capture an active craft while it is a safe distance from a passive craft, and a net spool and alignment funnel to reel-in and guide the active craft safely to a docking position on the passive craft. The system of the invention has principal utility for docking spacecraft in zero or low-gravity environments. However, it can also be used in a wide range of other docking environments, such as underwater vehicles, docking of ancillary craft to a mother craft in subsonic flight, in-flight refueling systems, etc. While a preferred embodiment for docking of spacecraft is described in detail below, it is understood that the invention can readily be adapted to such other docking environments.

Figure 1:
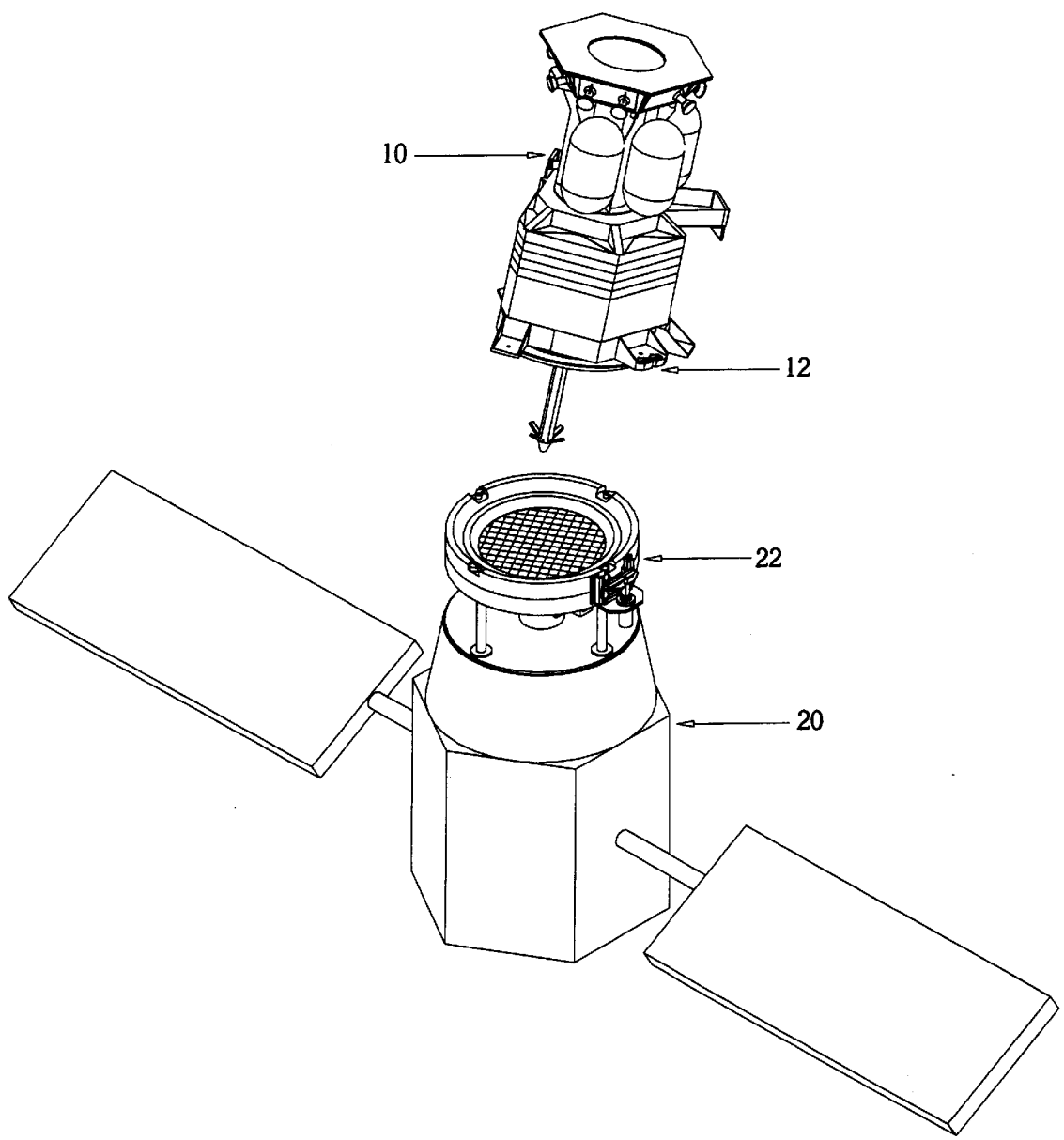
FIG. 1 is a perspective view illustrating a system in accordance with the invention for capturing and docking an active craft with a passive craft.

Referring to FIG. 1, a system for spacecraft docking is provided on the mating portions of two craft modules, referred to as the active craft 10, such as a small lander or explorer module, which is sent in flight from and to a passive craft 20, such as an orbiting station. The active craft 10 has a docking assembly 12 arranged at an exposed (lower) portion, while the passive craft 20 has a docking assembly 22 arranged at an exposed (upper) portion. The active craft 10 is shown in the figure as approaching the passive craft 20 at a safe distance in preparation for docking. Guidance of the active craft to this point is provided by its inertial propulsion system, i.e., jet thrusters. In the present invention, an improved system for docking avoids the need for complicated and precise controls of jet thrusters for docking maneuvers, and instead relies on a soft docking technique using motorized docking assemblies.

Figure 2:
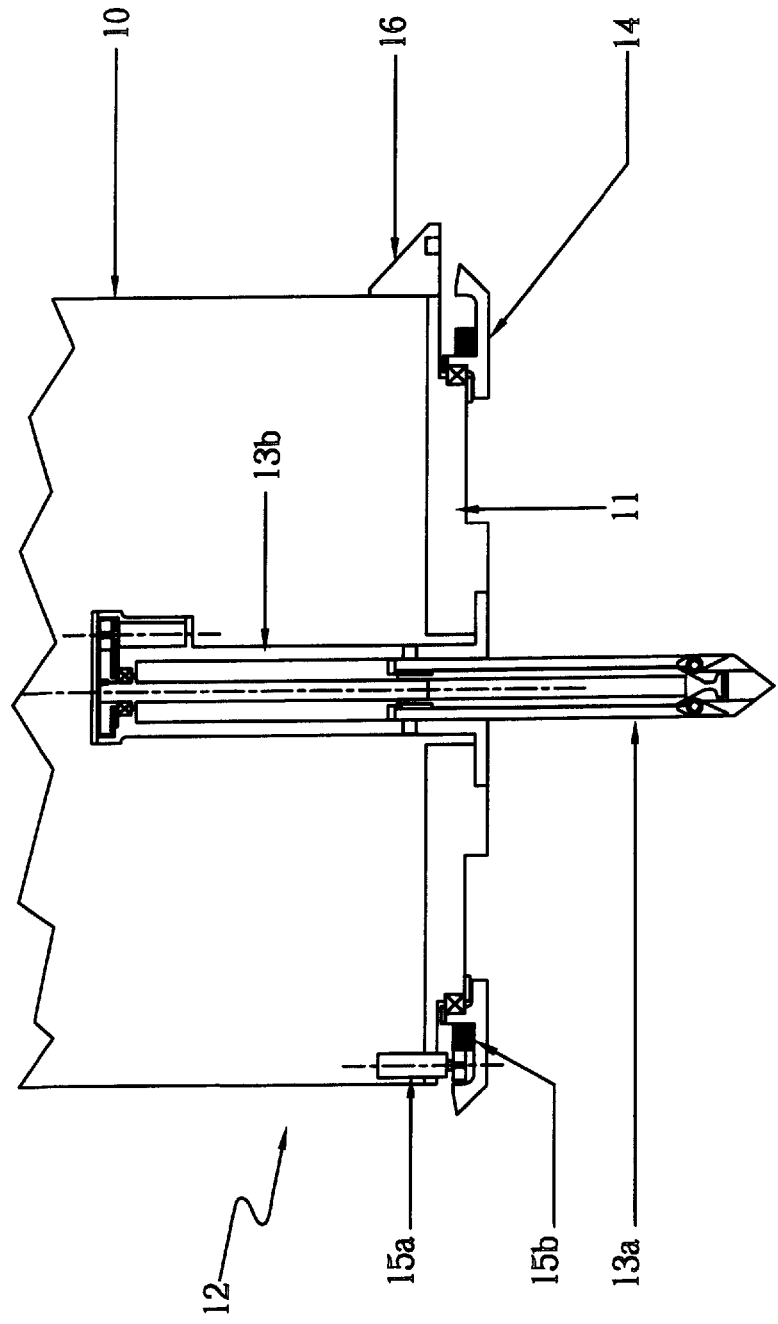
FIG. 2 is a schematic view showing a preferred docking assembly for the active craft.

Referring to FIG. 2, the docking assembly 12 on the active craft 10 is equipped with a telescoping spike member 13a slidably housed in a telescope-type housing 13b, a rotary ring or table 14 rotatably mounted on bearings to a hub 11 at an exposed end of the active craft, a rotary table actuator 15a coupled to the rotary table 14 through a driven ring gear 15b, and a connector half 16 which mates with a corresponding connector half on the passive craft to couple them together for power, data, and other functions.

Figure 3:
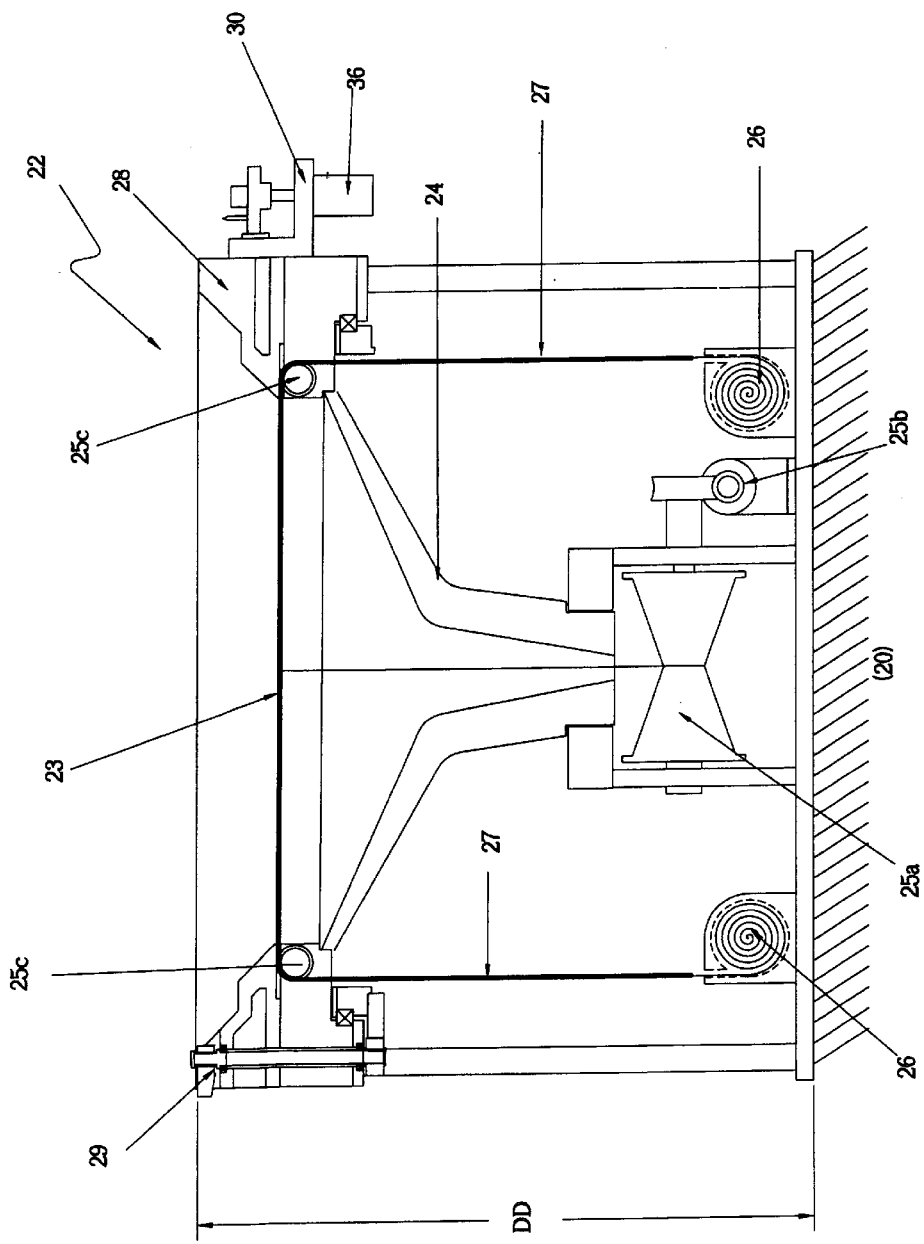
FIG. 3 is a schematic view showing a preferred embodiment of a docking assembly for the passive craft.

Referring to FIG. 3, the docking assembly 22 of the passive spacecraft 20 (orbiting station) is equipped with a deployed flexible net 23 for spike capture, an alignment funnel 24 for guiding the net and captured spike into the docking assembly, a net spool 25a and motorized drive 25b (with a worm gear set), a plurality of spring-loaded reels 26 coupled by belts 27 entrained over rollers and connected to the outer ends of the net 23, a contact member 28 shaped as a stepped annular ring, and a connector half 30 for mating with a connector half on the active craft. The spring-loaded net reels apply a constant tension on the net, e.g., 30–80 lbs., and a tension sensor is used to detect a large tension fluctuation caused by capture of the active craft's spike. The net spool 25a is recessed in the center of the docking assembly. A typical depth DD for the docking assembly is 30 cm. The docking assembly also has preload wedges 29 which are actuated by a ring drive to preload the active craft's rotary table against the passive craft's contact ring.

In FIGS. 4A and 4B, the telescoping spike is shown in detail in the extended and retracted positions, respectively. The spike shaft 13a can be extended from or retracted into the housing 13b by means of a lead screw 13c driven by a motor 13d. The spike shaft 13a is retracted into its housing 13b within the spacecraft's envelope for cruise and is driven to the extended position at a defined time or distance prior to docking approach. LASER distance-measuring sensors can be used to trigger the spike extension at a predetermined separation distance between active and passive spacecrafts. The telescoping action is accomplished through the motorized lead screw assembly. The tip of the telescoping spike is fitted with four spring-loaded capture tabs 13e which engages with the net. The tabs 13e are deployed in a 'hooked' position for capture and retracted for net release by means of a tab actuator 13f that is driven by the lead screw at the end of the spike shaft's travel. A damping array of dashpots and springs can be integrated with the telescoping spike housing to help dissipate kinetic energy from contact of the spike member with the passive craft's docking assembly. As indicated in the figure, an extended length EL for the spike shaft from the housing may be in the range of 10 to 30 cm for a small spacecraft (depending on the spacecraft dimensions, weight, and layout).

Figure 5A:
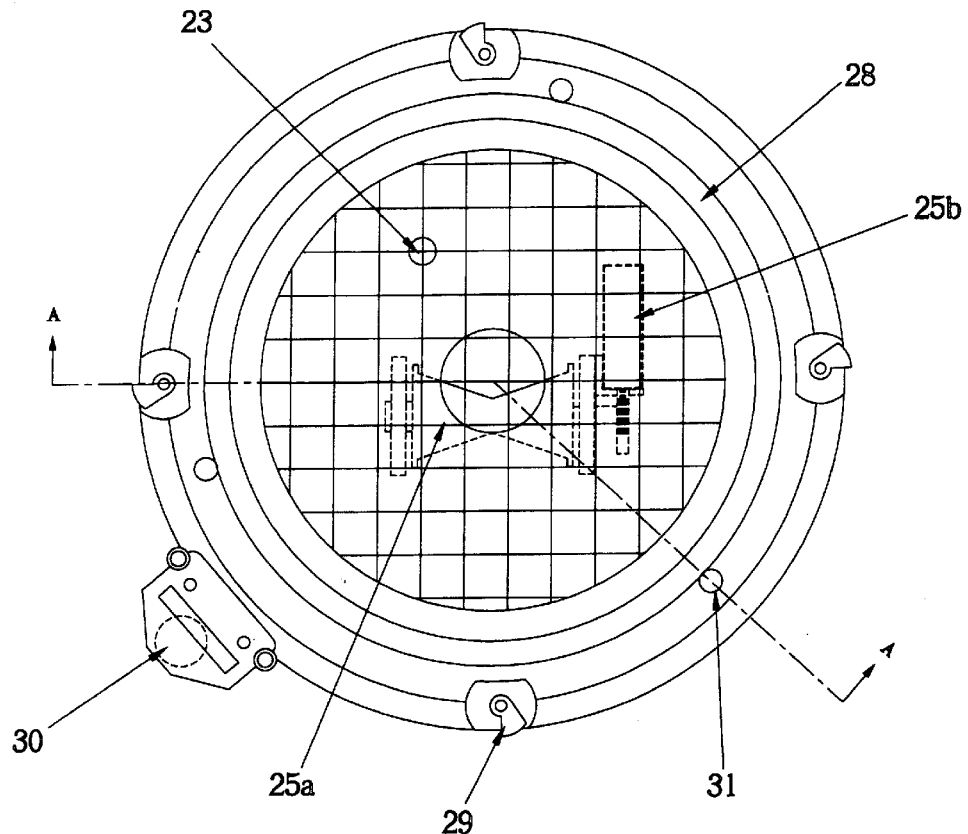
FIG. 5A is a plan view and FIG. 5B is a side view, taken along viewlines A—A in FIG. 5A, showing the passive craft's docking assembly in greater detail.
Figure 5B:
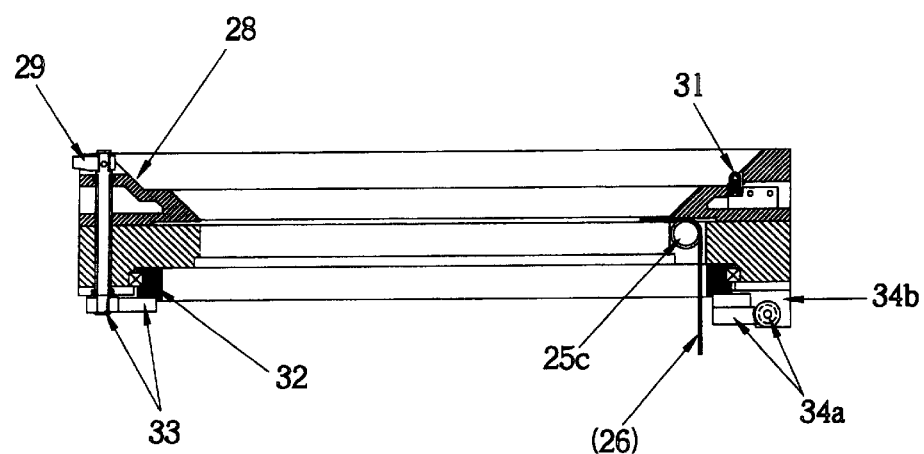

In FIGS. 5A and 5B, the passive craft's docking assembly is shown in greater detail. The net 23 is deployed over a circular capture area of the docking assembly and is held under constant tension (by the spring-loaded reels 26 shown in FIG. 3) at a plurality of locations (6) equally spaced around the circumference of the capture area. The net 23 is also tied at its center point to the motorized net spool 25a. When the spool 25a is activated (through sensors monitoring the tension in the net tie down points), the net 23 is pulled towards the center of the alignment funnel 24, bringing with it the captured spike and the docking assembly of the active spacecraft for mating with that of the passive craft.

The extent of capture area of the exposed net is determined by the amount of misalignment which may be required for capture. For a small lander as shown in the preferred embodiment, the capture area may be in the range of about 26 cm in diameter, and the net may have a 2.5 cm square mesh size. These dimensions would be sufficient for capture with up to ±20 cm and ±20 degrees of angular misalignment. The net ensures a positive capture each time the active spacecraft approaches the orbiting station and at the same time provides a means of dissipating the kinetic energy from the active spacecraft by acting as a damping member.

Figure 6:
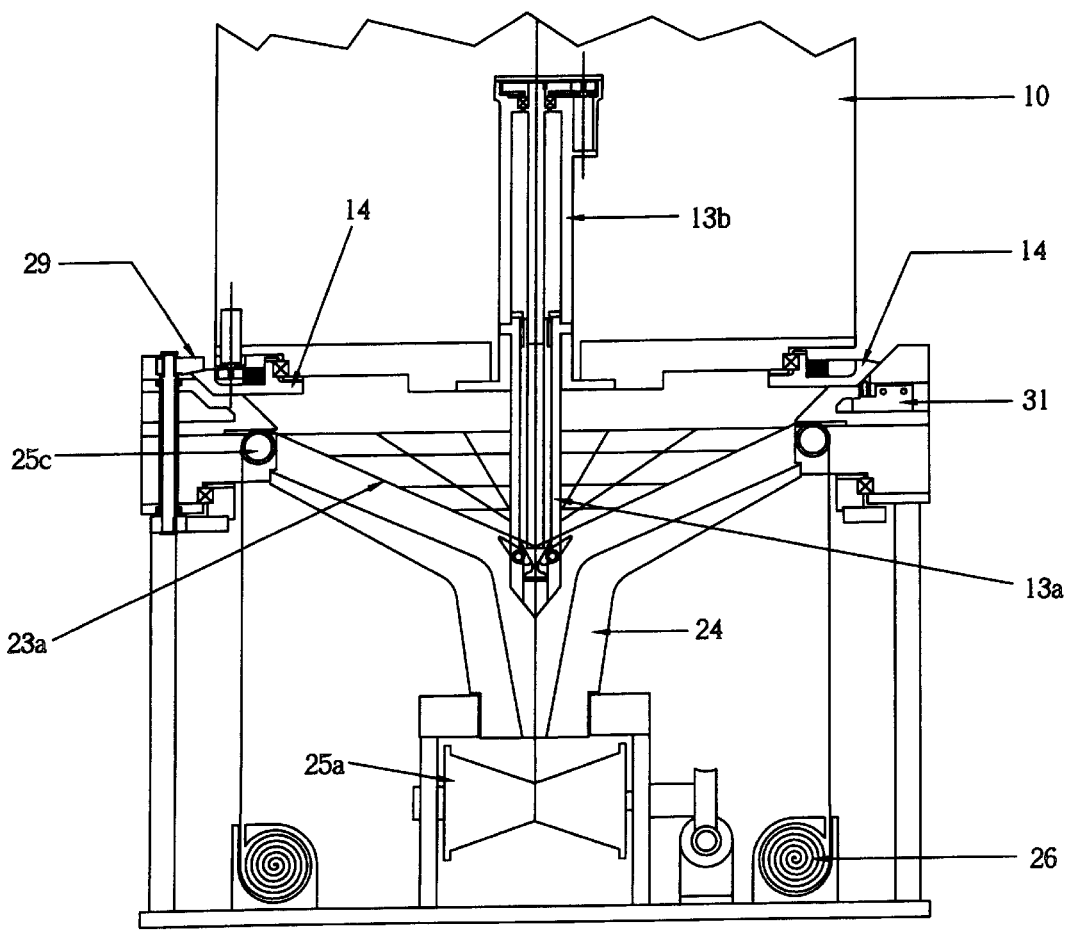
FIG. 6 is a view illustrating the docking and pre-loading of the active craft to the passive craft.

Referring to FIGS. 5A and 6, there are three pressure sensors 31 located in the mating interface of the contact ring 28 of the passive station. The functions of the pressure sensors are two fold. First, they are used to determine when radial alignment is achieved between the contact members of the active and passive spacecrafts. The initial preload between the contact members (rotary table 14 and contact ring 28) of the spacecrafts is provided by the reeled-in net of the passive craft pulling on the spike member 13a of the active spacecraft. When the contact members are mated in contact with each other, the pressure sensors are triggered. Pre-determined limits on the pressure sensors will generate a signal to turn the net spool motor to the "off" condition once initial preload has been achieved. The other function of the pressure sensors 31 is to trigger the locking motion of the preload wedges 29 (simultaneously with turning off the net spool motor) and to determine that the right amount of preload exists (between the spacecrafts) before shutting off the wedge preload actuator.

There are four preload wedges 29 spaced around the mating interface of the contact ring 28 on the passive station. During approach and mating, the wedges are turned away from the locking position over the alignment interface. A motorized ring 32 and pinion drives 33 for the preload wedges 29 are driven through a worm gear set 34a by a motor 34b upon actuation by the pressure sensors as described above.

Figure 7B:
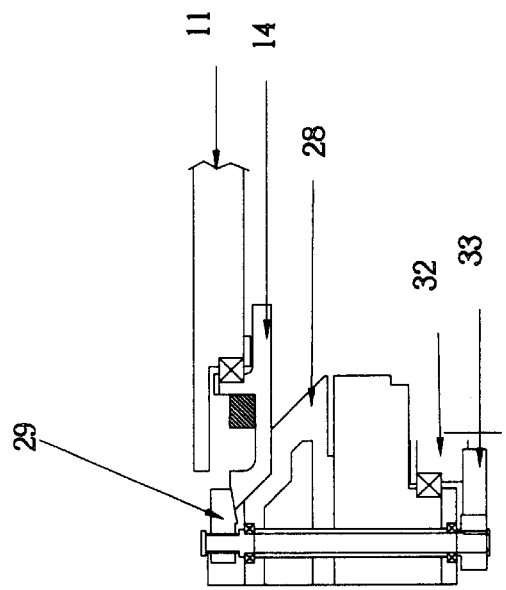
FIGS. 7A and 7B are side views showing preload wedges of the passive craft's docking assembly in the unlocked and locked positions.
Figure 7A:
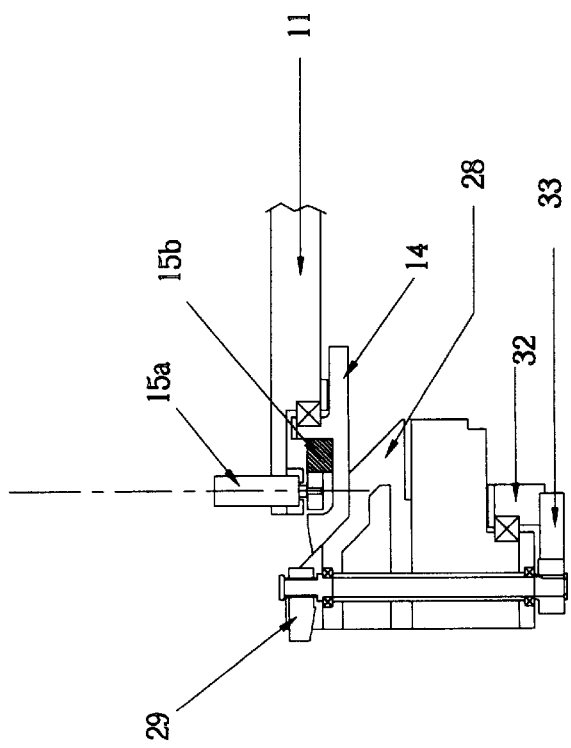

As shown in FIGS. 6, 7A and 7B, once activated, the motorized ring 32 drives the pinion gears 33 to turn the wedges 29 over the annulus of the active spacecraft's rotary table 14. By means of cam surfaces provided on the wedges, continued rotation preloads the two contact members together. At this point, the active spacecraft is preloaded to the passive station in the axial direction with sufficient force to prevent any relative movement under expected forces. For the small lander, a preload force in the range of 200 to 600 lbs. may be used. Due to the rotational freedom of the rotary table, the active spacecraft remains free to rotate to an angular alignment position about an axis in line with spike member 13a.

Figure 8:
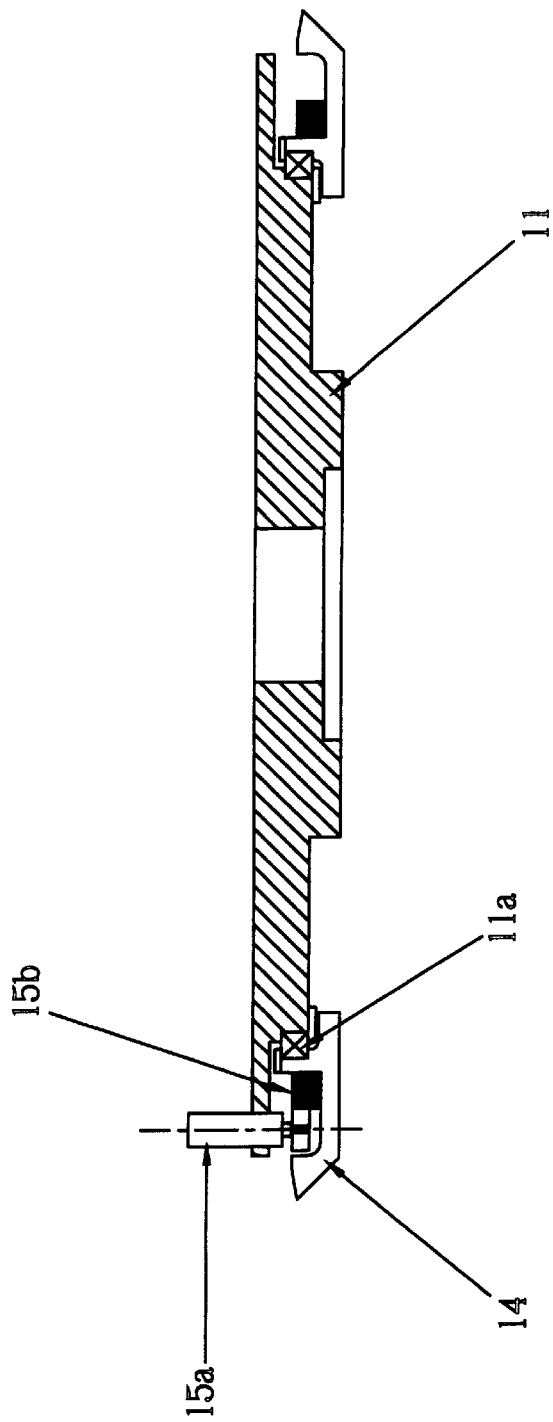
FIG. 8 is a sectional side view of the rotary table mating component for spacecraft docking.

As shown in FIG. 8, the rotary table 14 is rotatably mounted on bearings 11a to the hub 11 of the active spacecraft. The rotary table has an outer annulus which serves as the mating interface with the contact ring of the passive station. The rotary table 14 and annulus and the hub 11 are coupled together through the four-point contact bearings 11a that allow relative rotation between the two. The outer edge of the annulus has a chamfered surface that provides final radial alignment with the passive station (which has a matching chamfered feature).

Figure 9:
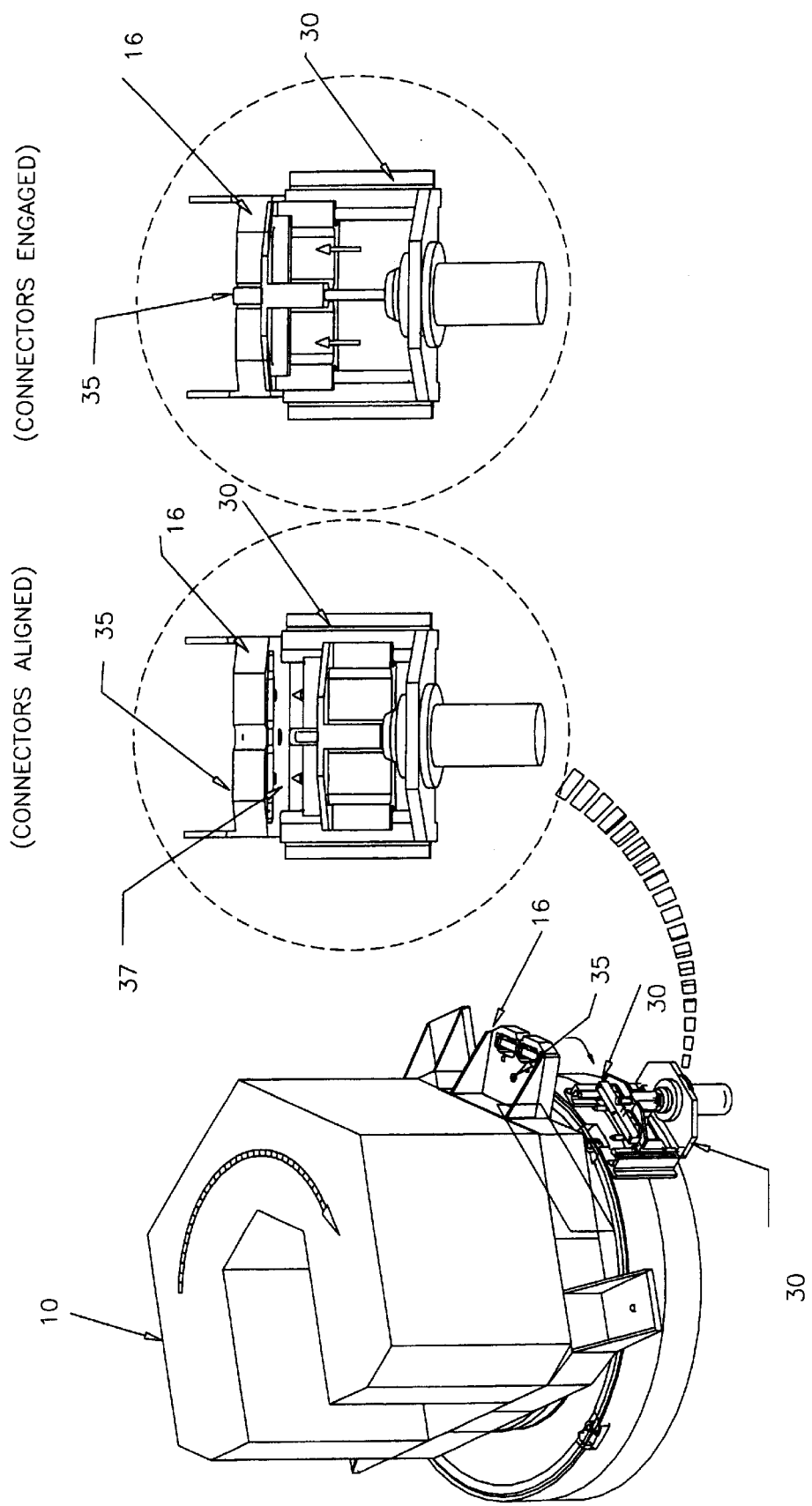
FIG. 9 is a perspective view showing connectors of the active and passive crafts' docking assemblies in aligned and engaged positions.

As shown in FIG. 9, after the radial alignment and axial preload sequences are completed, the turntable motor 15a is then activated to rotate and align the active spacecraft (in the direction of the clockwise arrows) and its connector half 16 with the connector half 30 of the passive station. The final rotational alignment position is detected by an optical sensor 35. The head of the sensor 35 is mounted on the active spacecraft and a narrow reflective strip is affixed to the connector half 30 of the passive station at the proper alignment position. When the sensor 35 and the reflective strip line up, the reflected light will trigger a preset signal that turns power off to the rotary table motor 15a.

With the connector halves rotated to the proper alignment position, the connector actuator 36 axially mates the male and female connector components together (see upward arrows in right-side inset in FIG. 9) into electrical and/or pneumatic connection with each other. The connector actuator 36 moves the connector components of the mating connector half of the passive craft preceded by two chamfered locking pins 37 that correct for any small rotational misalignment (not seen by the optical sensor) and positively lock the connector halves of the active and passive spacecrafts against relative rotation, thus ensuring successful mating between connectors.

Figure 10D:
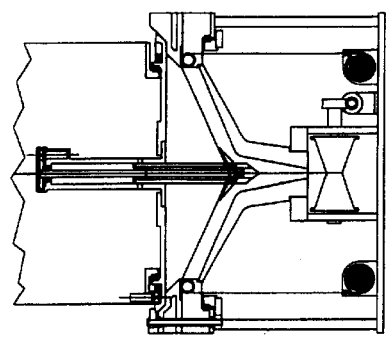
FIGS. 10A–10D illustrate the spacecraft docking sequence.
Figure 10C:
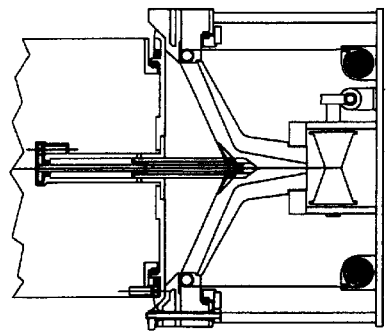
Figure 10B:
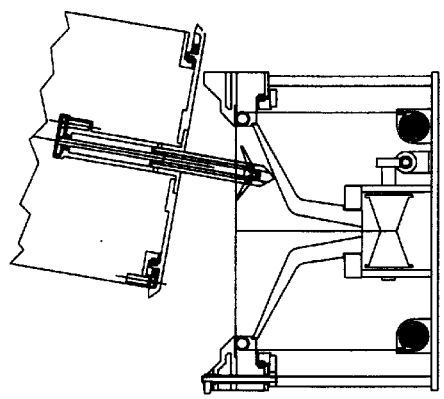
Figure 10A:
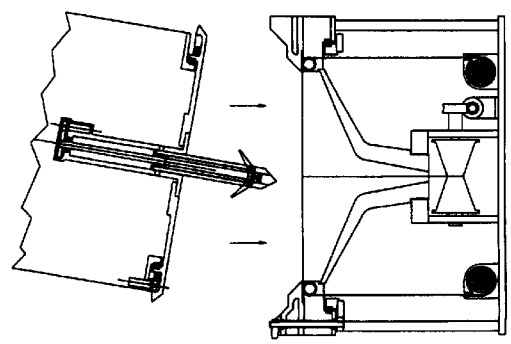

FIGS. 10A–10D show the overall sequences for docking of the spacecraft. In FIG. 10A, the active spacecraft approaches the passive orbiting station with spike extended within allowable misalignment limits, e.g., lateral misalignment of ±20 cm, and angular misalignment of ±20 degrees. In FIG. 10B, the spike penetrates the net, and the active spacecraft is captured and some kinetic energy is dissipated. In FIG. 10C, the net spool pulls the net with the spike toward the center of the alignment funnel to mate the active spacecraft with the orbiting station. In FIG. 10D, the preload wedges are rotated over the mating interface to preload the docking assemblies together. Finally, the rotary table of the active craft is activated for spacecraft/connector alignment, and the connectors halves are mated following insertion of the connector locking pins.

Figure 11C:
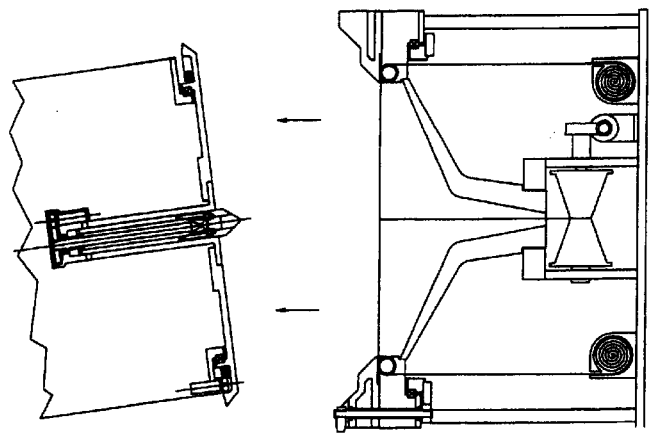
FIGS. 11A–11C illustrate the spacecraft release sequence.
Figure 11B:
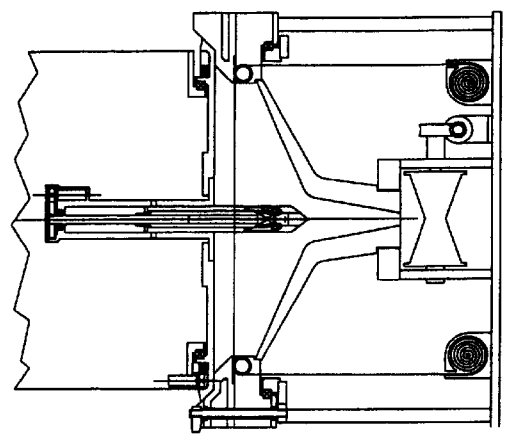
Figure 11A:
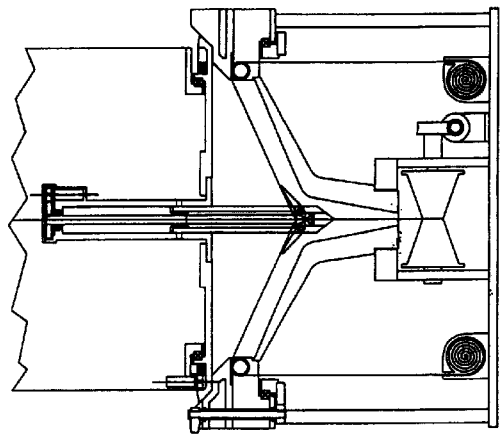

The spacecraft is released from the orbiting station through the sequences shown in FIGS. 11A–11C. In FIG. 11A, the net spool is reversed and returns the net to its deployed position due to the spring-loaded tension from the net reel points. The preload wedges are rotated away from the mating interface. In FIG. 11B, the capture tabs of the spike are retracted to disengage the spike from the net. In FIG. 11C, the spacecraft is freed to pull away from the orbiting station.

While a preferred embodiment of the invention has been described, it is understood that many modifications and variations may be devised given the above description of the principles of the invention. It is intended that all such modifications and variations be considered as within the spirit and scope of this invention, as it is defined in the following claims.

We claim:

1. A system for capturing and docking an active craft to a passive craft comprising:

a first docking assembly arranged at an exposed portion of the active craft having a first contact member, and a spike member fixed in a central position with a capture end projecting outwardly from said first contact member;

a second docking assembly arranged at an exposed portion of the passive craft having a second contact member for mating with said first contact member of the active craft, a flexible net having an open-mesh capture area deployed over a target area of said second contact member, and a motorized net drive for reeling in the capture area of said net into a recessed portion of the passive craft's docking assembly, said spike member having means on its capture end for engaging said flexible net; and means for actuating said motorized net drive when said spike member has become engaged with said flexible net so as to reel in said spike member and guide said first contact member of the active craft into mating contact with said second contact member of the passive craft.

2. A system according to claim 1, wherein said contact member of said first docking assembly is composed of a rotary table rotatably mounted to a hub of the active craft, and further includes an actuator drive for rotating said rotary table relative to the hub to bring the active craft to a predetermined angular alignment position relative to the passive craft.

3. A system according to claim 1, wherein said spike member is extendable from a telescope-type housing and has extendable capture tabs on its capture end to allow it to become engaged with the net.

4. A system according to claim 1, wherein said second docking assembly includes a plurality of preload wedges spaced circumferentially around said second contact member, and a motorized drive for driving the wedges to locking positions against said first contact member of the active craft.

5. A system according to claim 1, wherein said first and second contact members have chamfered edges that mate together to radially align the active craft with the passive craft in a docked position.

6. A system according to claim 1, wherein said net has outer edges that are coupled by belts entrained around rollers to spring-loaded windup reels, and a center point of the capture area of the net is coupled by a belt to a motorized net spool located in a central position in the recessed portion of said docking assembly of the passive craft.

7. A system according to claim 6, further comprising an alignment funnel which is provided with inclined walls tapering from an inner annulus of said second contact member inwardly to guide the net with the captured end of the spike member towards the net spool in the recessed portion of the docking assembly.

8. A system according to claim 6, wherein said second contact member includes pressure sensors for detecting when said first contact member is mated in alignment with said second contact member and for providing a signal to turn power off to said net spool.

9. A system according to claim 4, wherein said second contact member includes pressure sensors for detecting when said first contact member is mated in alignment with said second contact member and for providing a signal to turn power on to said motorized drive for driving said preload wedges to locking positions against said first contact member.

10. A system according to claim 2, wherein said first docking assembly includes a first connector half mounted to the hub of the active craft, and said second docking assembly includes a second connector half mounted to said second contact member at the predetermined angular alignment position.

11. A system according to claim 10, wherein said first and second connector halves include a sensor device for detecting when said rotary table has been rotated relatively to bring the hub and said first connector half to the predetermined angular alignment position and for providing a signal to turn power off to said actuator drive for rotating said rotary table.

12. A system according to claim 11, wherein said sensor device also provides a signal upon detecting the predetermined angular alignment position for actuating a connector drive to mate functional components of said connector halves together.

13. A spacecraft system comprising:

an active craft having a first docking assembly arranged at an exposed portion of the active craft having a first contact member, and a spike member fixed in a central position with a capture end projecting outwardly from said first contact member;

a passive craft having a second docking assembly arranged at an exposed portion of the passive craft having a second contact member for mating with said first contact member of the active craft, a flexible net having an open-mesh capture area deployed over a target area of said second contact member, and a motorized net drive for reeling in the capture area of said net into a recessed portion of the passive craft's docking assembly, said spike member having means on its capture end for engaging said flexible net; and means for actuating said motorized net drive when said spike member has become engaged with said flexible net so as to reel in said spike member and guide said first contact member of the active craft into mating contact with said second contact member of the passive craft.

14. A spacecraft system according to claim 13, wherein said contact member of said first docking assembly is composed of a rotary table rotatably mounted to a hub of the active craft, and further includes an actuator drive for rotating said rotary table relative to the hub to bring the active craft to a predetermined angular alignment position relative to the passive craft.

15. A spacecraft system according to claim 13, wherein said spike member is extendable from a telescope-type housing and has extendable capture tabs on its capture end to allow it to become engaged with the net.

16. A spacecraft system according to claim 13, wherein said net has outer edges that are coupled by belts entrained around rollers to spring-loaded windup reels, and a center point of the capture area of the net is coupled by a belt to a motorized net spool located in a central position in the recessed portion of said docking assembly of the passive craft.

17. A spacecraft system according to claim 16, further comprising an alignment funnel which is provided with inclined walls tapering from an inner annulus of said second contact member inwardly to guide the net with the captured end of the spike member towards the net spool in the recessed portion of the docking assembly.

18. A system according to claim 1, adapted to a active/passive craft environment selected from the group comprising: spacecraft in a zero or low-gravity environment; underwater vehicles; docking of ancillary craft to a mother craft in subsonic flight; and in-flight refueling systems.

* * * * *